UNITED STATES PATENT OFFICE.

SAMUEL PEACOCK, OF CHICAGO, ILLINOIS, ASSIGNOR, BY MESNE ASSIGNMENTS, TO AGRICULTURAL RESEARCH CORPORATION, OF NEW YORK, N. Y., A CORPORATION OF NEW YORK.

PROCESS OF FORMING DOUBLE NITRIDS.

1,154,800.     Specification of Letters Patent.     Patented Sept. 28, 1915.

No Drawing.     Application filed May 31, 1913. Serial No. 770,933.

*To all whom it may concern:*

Be it known that I, SAMUEL PEACOCK, a citizen of the United States, residing at Chicago, in the county of Cook and State of Illinois, have invented certain new and useful Improvements in Processes of Forming Double Nitrids; and I do hereby declare the following to be a full, clear, and exact description of the invention, such as will enable others skilled in the art to which it appertains to make and use the same.

This invention relates to a process of fixing atmospheric nitrogen, and has for its object to chemically fix such nitrogen in an expeditious and comparatively inexpensive manner.

To these ends the invention consists in the steps and combinations of steps more fully hereinafter disclosed and particularly pointed out in the claims by which nitrogen is chemically combined with a metal and with a non-metallic element or with two metals to form a double nitrid, as will now be explained.

In the process of making silicon carbonitrid ($SiC_2N_2$) I observed that the temperature of the formation of the double nitrid is so nearly that of its dissociation, that the process of producing the latter became one of exceptional refinement in carrying it out. I discovered, however, upon using a mixture of calcium oxid, and aluminum oxid or of other oxids, with the silica and carbon, the range of difference between the temperature of formation and dissociation was sufficiently increased to materially lessen the need of an exceptionately accurate control of the furnace temperatures. This led me to the further discovery that it was practical to fix atmospheric nitrogen by means of double nitrids of a metal and a non-metal in which silicids or silicon carbids are utilized, and thus produce compounds such as:—

(1)   $(AlN)_4.Si_3N_4$
(2)   $(Ca_3N_2)_2.Si_3N_4$
(3)   $(K_3N)_4.Si_3N_2$, as well as other like compounds in which other metals may be substituted for those mentioned. In other words, I discovered that it was possible to substitute silicon for carbon in the older processes if metal oxids were mixed with the charge of carbon and silica.

In carrying out my process, I provide a mixture of carbon, silica and an oxid of a metal, using either a natural compound such as feldspar, or a mixture of oxids in such proportions that there will be present in the charge sufficient carbon to effect the reduction of substantially all the silica present, and to cause the formation of the higher carbid of silicon $SiC_2$. This latter carbid is not very stable at the temperature of its formation, but it readily reacts with alumina, calcium oxid, etc., to form silicids in accordance with the following:—

$$3SiO_2 + 12C = 3SiC_2 + 6CO$$
$$2Al_2O_3 + 3SiC_2 = Al_4Si_3 + 6CO$$

or—

$$3SiO_2 + 12C = 3SiC_2 + 6CO$$
$$6CaO + 3SiC_2 = Ca_6Si_3 + 6CO$$

or—

$$3SiO_2 + 12C = 3SiC_2 + 6CO$$
$$6K_2O + 3SiC_2 = K_{12}Si_3 + 6CO$$

These reactions, (or similar reactions in which other metals are substituted for the aluminum, calcium or potassium) are by my process effected in an atmosphere of nitrogen. Further, the metal silicids produced being unstable, ordinarily tend to break down, substantially as follows,—

(1)   $Al_4Si_3 = Al_3Si_3 + Al_2$
(2)   $Ca_6Si_3 = Ca_3Si_3 + Ca_3$
(3)   $K_{12}Si_3 = K_6Si_3 + K_6$

This dissociation of these silicids is more or less aided by the presence of uncombined carbon, which forms carbids with the metal liberated. In the presence of nitrogen, however, I have found that these silicids decompose into double nitrids of a metal and a non-metal, substantially as follows:—

(1)   $Al_3Si_3 + 4N_2 = Al_4N_4.Si_3N_4$
(2)   $Ca_3Si_3 + 4N_2 = Ca_6N_4.Si_3N_4$
(3)   $K_6Si_3 + 4N_2 = K_{12}N_4.Si_3N_4$

I find these resulting double nitrids are quite stable over a temperature range so wide as to eliminate troublesome furnace control refinements in practical furnace operations and that the zinc carbid ZnC is a very useful one to employ in the beginning. Accordingly, in the operation of my process I take the required mixture of carbon, metal oxids, and silica, as separate substances, or any natural or artificial compound or mixture of the same, and heat such mixture by any suitable means in an atmosphere of nitrogen. Preferably, I cake or briquet the mixture, and make use of a producer gas containing a low percentage of carbon dioxid as a source of nitrogen; the said producer gas being passed over or through the cakes or mixture as the same is heated. The temperature required is from 1600° to 2000° C. depending upon the velocity with which the producer gas is passed through or over the furnace mixture. The first step in the reaction produces carbon monoxid CO as a gaseous reaction product, and the reaction velocity is governed by the partial pressure of this said carbon monoxid that is allowed to exist in the furnace atmosphere; hence, in order to hasten this velocity and at the same time increase the above range of temperature differences, I keep the partial pressure of this gaseous reaction product as low as possible as by sweeping the producer gas somewhat rapidly through or over the charge in the furnace under treatment.

I preferably use any suitable furnace employing electricity having opposed electrodes as a source of heat, and provided with suitable well known devices for a continuous feeding of the charge and for the removal of the furnace product.

In carrying out the above process I have found evidences of a nitrogen compound corresponding to the formula $Al_2N_2.Si_3N_4$, but could not prove it to be anything more than a mixture of the two compounds $Al_2N_2$ and $Si_3N_4$, which may have resulted from excessive temperatures in particular portions of the furnace. However, although such compounds are included in my discovery, yet it is important to avoid the formation of such compounds or mixtures, because they require a greater expenditure of energy, and fix a much less quantity of nitrogen than do the higher nitrids. Such avoidance can be accomplished by watching the operation, and seeing that the temperatures are as even as possible all over the reaction zone.

In making up the furnace charge I find a desirable mixture to consist in feldspar and phosphate rock in such proportions that the silica of the feldspar is supplied with ample calcium oxid from the phosphate rock to form the above calcium silicid, for in such case not only is the silica, alumina and calcium oxid of the minerals thus utilized to fix nitrogen, but the potassium of the feldspar, and the phosphorus of the phosphate rock are first both volatilized in the form of oxids, and then converted into carbo-nitrids and carbids. In this latter form they may be treated with hot water under pressure and converted into phosphoric acid, potassium oxid and ammonium salts, thus forming valuable by-products.

It will be clear from the foregoing that the above various reactions, illustrated with the use of a higher carbid of silicon, $SiC_2$, take place simultaneously or successively in the furnace until the final double nitrid is formed, and it should also be observed that it is important to form or employ this particular class of higher carbids, for it is these same higher carbids that are found to effect the dissociation in the cyanamid process of fixing nitrogen. Such higher carbids are $SiC_2$, $ZnC$, $Al_2C_3$, $CaC$. They invariably give rise in the reaction to a carbon valency corresponding to $C_2H_4$, and this said valency will cause for example the compound $Al_4N_4.Si_3N_4$ to be produced if the temperature is not too high instead of the compound $Al_2N_2.Si_3N_4$. Of course, if such higher carbids as $ZnC$, $Al_2C_3$, $CaC$, etc., are substituted for the silicon-carbid $SiC_2$ in the above reactions, then the double nitrids produced will be correspondingly changed. In other words, in the presence of nitrogen I may employ two oxids of metals, instead of an oxid of a metal, and an oxid of a non-metal, and produce the above higher carbids of the metals during the reaction, which will immediately break down, and give rise to double nitrids of the corresponding metals present, instead of double nitrids of a metal and a nonmetal.

It is obvious that those skilled in the art may vary the steps without departing from the spirit of my invention, and therefore I do not wish to be limited to the above disclosure except as may be required by the claims.

What I claim is:—

1. The process of fixing atmospheric nitrogen which consists in heating in the presence of said nitrogen a suitable oxid mixed with a higher carbid and to a temperature sufficient to produce a double nitrid, substantially as described.

2. The process of fixing atmospheric nitrogen which consists in heating in an atmosphere containing said nitrogen, an oxid mixed with a higher carbid of a non-metal and to a temperature sufficient to produce a double nitrid containing said non-metal, substantially as described.

3. The process of fixing atmospheric nitrogen which consists in providing a mixture of silica, a suitable oxid and carbon; and heating said mixture in an atmosphere of nitrogen to a temperature sufficient to first form a higher carbid of silicon, and then to form a double nitrid containing silicon, substantially as described.

4. The process of fixing atmospheric nitrogen which consists in providing a mixture of silica, calcium oxid and carbon; and heating said mixture to a temperature sufficient to produce a double nitrid of calcium and silicon, substantially as described.

5. The process of fixing atmospheric nitrogen which consists in heating in the presence of said nitrogen a suitable oxid mixed with a higher carbid to a temperature sufficient to produce a double nitrid, while sweeping said nitrogen over said mixture to reduce the partial pressure of the evolved carbon monoxid gas, substantially as described.

6. The process of fixing atmospheric nitrogen which consists in heating in an atmosphere containing said nitrogen, a suitable oxid mixed with a suitable higher carbid to a temperature sufficient to produce a double nitrid while sweeping said nitrogen over said mixture to reduce the partial pressure of the evolved carbon monoxid gas substantially as described.

7. The process of fixing atmospheric nitrogen which consists in providing a mixture of silica, a suitable oxid and carbon; and heating said mixture in an atmosphere of nitrogen to a temperature sufficient to first form a higher carbid of silicon, and then to form a double nitrid while reducing the normal partial pressure of the evolved gaseous reaction products, substantially as described.

8. The process of fixing atmospheric nitrogen which consists in providing a mixture of silica, calcium oxid and carbon; and heating said mixture to a temperature sufficient to produce a double nitrid of calcium and silicon while reducing the partial pressure of the evolved carbon monoxid gas, substantially as described.

In testimony whereof I affix my signature, in presence of two witnesses.

SAMUEL PEACOCK.

Witnesses:
 EDW. F. JANES,
 F. A. WITHERSPOON.